United States Patent [19]

Coueille

[11] 4,150,221

[45] Apr. 17, 1979

[54] ARRANGEMENT FOR SEALING AN ELECTRIC CELL

[75] Inventor: Daniel Coueille, Poitiers, France

[73] Assignee: Saft-Societe des Accumulateurs Fixes et de Traction, Romainville, France

[21] Appl. No.: 893,424

[22] Filed: Apr. 4, 1978

[30] Foreign Application Priority Data

Apr. 14, 1977 [FR] France .............................. 77 11236

[51] Int. Cl.² .............................................. H01M 2/08
[52] U.S. Cl. .................................... 429/173; 429/174; 429/185
[58] Field of Search ................................ 429/171–174, 429/185, 157, 162, 225, 219, 224, 206

[56] References Cited

U.S. PATENT DOCUMENTS 3,457,117  7/1969  Angelovich ........................ 429/174
3,615,861  10/1971  Braem .............................. 429/174 X Primary Examiner—Charles F. LeFevour
Attorney, Agent, or Firm—Kenyon & Kenyon, Reilly, Carr & Chapin

[57] ABSTRACT

An arrangement for sealing a button-type electric cell. Such a cell comprises a metal cup which contains a first electrode, and a metal cap which forms a cover to the cup and which contains a second electrode of opposite polarity. The rim of the cup is turned down over a seal disposed on the rim of the cap. A metal ring which has a cylindrical portion in contact with the inner face of the cylindrical wall of the cup, an intermediate portion which has a stair-case or an oblique cross-section and an annular portion which is orthogonal to the cylindrical portion is disposed in the cup, these latter two portions making it possible to compress the seal against the cylindrical wall of the cup.

4 Claims, 3 Drawing Figures

ARRANGEMENT FOR SEALING AN ELECTRIC CELL

The invention relates to an arrangement for sealing an electric cell, in particular a button type cell. This cell type is well-known and widely used for primary cells or storage cells which have only a small space to occupy. Numerous types of casings have been proposed, but they boil down in practice to the following arrangement: a metal cup and a metal cap fit into each other and are separated by an insulating seal which is used simultaneously for electrical insulation and for sealing. Each of the metal members is connected electrically to a respective one of the electrodes and therefore acts as a positive or a negative terminal.

This basic arrangement gives rise to a great number of variants, it being possible to line the cup and the cap with a second cup or cap, and the method of placing the seal and turning down the cup and the cap over each other differ from one variant to another. One of the simplest forms is that which is described and illustrated, among other patents, in U.S. Pat. No. 3,853,627. The (positive) cup is deeper than the cap and its diameter is greater. The cap acts as the cover of the cup and carries the seal, which is preferably moulded on its rim. The end of the cylindrical wall of the cup is turned down over the seal, thus providing sealing. A ring with an L-shaped cross-section, provided on the bottom of the cup, supports the seal and provides a reaction to the turning down force on the rim of the cup. Such a disposition, which is easy to produce and does not require a great number of parts, is sufficient in the case for which it is described in the above-mentioned patent, namely for non-aqueous electrolyte cells. In contrast when the electric cell contained in such a casing has an alkaline electrolyte, the sealing means proves insufficient.

The present invention aims to produce a cell which remains sealed even with an alkaline electrolyte.

It provides an arrangement for sealing an electric cell which comprises: a casing made of a metal cup containing a first electrode and of a metal cap which forms a cover to the cup and containing a second electrode of opposite polarity to the first; an insulating seal disposed on the rim of the cap with the rim of the cup turned down over the insulating seal; and a metal ring, having a first cylindrical portion disposed against the inside of the cylindrical wall of the cup, a second, annular portion which extends perpendicularly to the first portion over the surface of the first electrode and a third intermediate portion which is situated between the first and second portion; the arrangement being such that a part of the insulating seal is compressed between the cylindrical wall of the cup and the said third portion of the metal ring.

In this way, the seal provides a lengthened leakage path and is compressed between the third portion and the cylindrical wall of the cup by the driving force used for turning down the rim of the cup.

The third (or intermediate) portion can have various shapes. The preferred shapes are a stair-case cross-section or a rectilinear cross-section, forming an obtuse angle with each of the other portions.

The invention will be better understood from the following description of two variants illustrated by way of example in the accompanying drawing in which.

Figure 1:
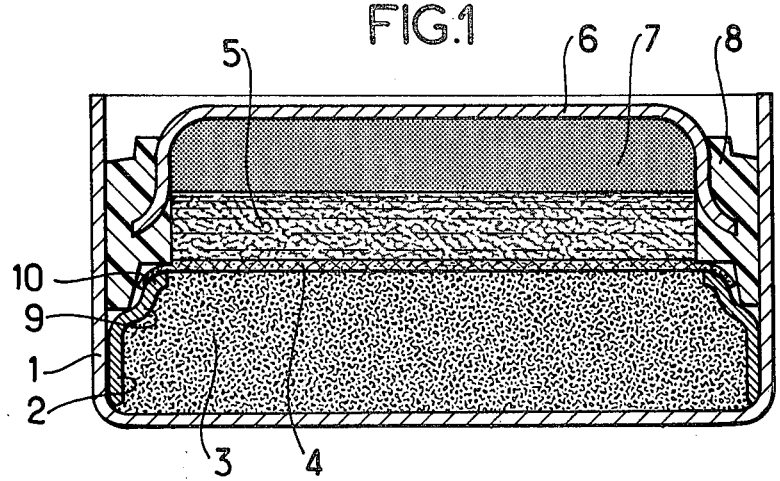
FIG. 1 shows a cross-section during assembly of a first variant of an electric cell including an arrangement in accordance with the invention.

In FIG. 1, reference 1 designates a metal cup shown in the state in which it is when the components of the electric cell are put in position. A metal cap carries a seal 8 which has been moulded on its rim. The cup 1 contains a positive active mass 3 which, in the example shown, has silver oxide as the active component. The cap 6 contains a negative active mass 7 which contains zinc as the active component. A separator formed by a disc 4 and a cellulose felt 5 impregnated with alkaline electrolyte, is disposed between the active masses 3 and 7. The electrolyte is a concentrated potassium hydroxide solution saturated with potassium zincate.

A metal ring is disposed in the cup 1. A first portion 2 of this ring is cylindrical and touches the cylindrical wall of the cup 1. A second portion 10 is annular and extends in a direction which is generally perpendicular to the first portion 2. A third or intermediate portion 9 has a stair-case cross-section; in other words the connection to the second portion 10 is by a step, the cross-section of the third portion 9 taking firstly a direction perpendicular to the first portion then a direction parallel to that portion before taking the direction of the second portion. Of course, the number of steps could be greater than one.

Figure 2:
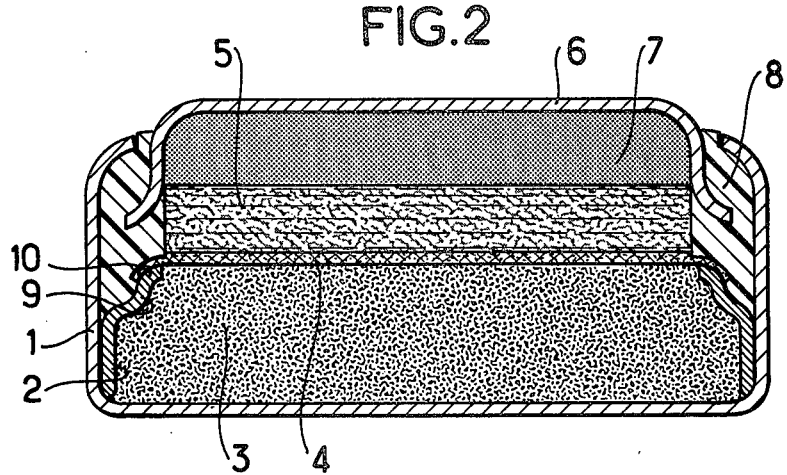
FIG. 2 shows a cross-section of the electric cell in FIG. 1, completely finished.

As will be seen in FIG. 2, it results from this disposition that when the rim of the cup 1 is turned down over the seal 8, the latter is compressed not only on the second portion 10, but also between the cylindrical wall of the cup 1 and the third portion 9. Sealing is therefore improved.

Figure 3:
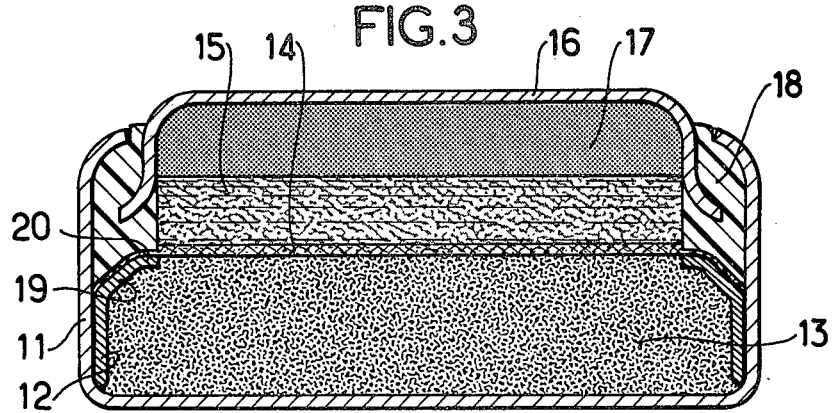
FIG. 3 shows a cross-section of a second variant of an electric cell which includes an arrangement in accordance with the invention.

FIG. 3 shows another embodiment of the invention.

There is again a cup 11 which contains a positive active mass 13, a cap 16 which contains a negative active mass 17, a separator made of a disk 14 with a cellulose felt 15 impregnated with electrolyte, and a seal 18 moulded on the edge of the cap 16. A metal ring in accordance with the invention is again composed of three portions: a first, cylindrical portion 12 is disposed against the cylindrical wall of the cup 11; a second, annular portion which is perpendicular to it extends over the surface of the mass 13; and a third portion 19 has a rectilinear shape and its cross-section is oblique in relation to the first and second portions. As in the embodiment in FIGS. 1 and 2, a part of the seal 18 is thus compressed between the cylindrical wall of the cup 11 and the third portion 19. Sealing is thus improved, and production is a little easier than in the case of the preceding figures.

What is claimed is:

1. An electric cell having an improved seal arrangement, the cell including an electrolyte; a cylindrical metal cup having a lip and a flat bottom and containing a first electrode; a metal cap serving as a cover for the cup and having a rim disposed in spaced relation to the inside of the cylindrical wall of the cup, the cap containing a second electrode of opposite polarity to the first electrode; a compressible insulating seal ring surrounding the rim of the cap; and a metal support ring having a cylindrical portion contiguous to the inside of the cylindrical wall of the cup, the cylindrical portion having a lower part adjacent to the bottom of the cup and an upper part, an annular portion spaced from and parallel to the bottom of the cup, the annular portion having a radially outer part and an inner part, and an intermediate portion which connects the outer part of the annular portion to the upper part of the cylindrical portion, the lip of the cup being turned inward over the insulating seal to compress said seal against the annular portion of said metal support ring, wherein the improvement comprises:

said intermediate portion extending axially upward and radially inward from the upper part of the cylindrical portion to the outer part of the annular portion to provide an upwardly opening annular space between said intermediate portion and the wall of the cup such that the outer part of the annular portion of the metal ring is spaced from said wall by a substantial distance relative to the spacing of the rim of the cap from said wall and said seal ring being formed with a part that fits within said annular space; the arrangement being such that said part of the seal ring is compressed radially between the cylindrical wall of the cup and said intermediate portion of the metal ring by the pressure exerted on the top of the seal by the turned down lip of the cup.

2. An electric cell according to claim 1 wherein the spacing of the outer part of the annular portion of the metal ring from the cylindrical wall of the cup is at least equal to the spacing of the rim of the cap from said wall.

3. An electric cell according to claim 1 wherein said intermediate portion has a stepped cross section.

4. An electric cell according to claim 1 wherein said intermediate portion has a rectilinear cross section which makes an obtuse angle with each of said cylindrical and annular portions of the metal ring.

* * * * *